United States Patent [19]
Irie et al.

[11] Patent Number: 5,511,048
[45] Date of Patent: Apr. 23, 1996

[54] MAGNETO-OPTICAL RECORDING AND REPRODUCING APPARATUS

[75] Inventors: Mitsuru Irie; Takeshi Utakouji; Morihiro Karaki; Nobuo Takeshita; Manabu Koike; Yasuyuki Satou; Naoyuki Egusa; Masahisa Shinoda, all of Nagaokakyo; Akira Ishimori, Amagasaki; Akihiro Shima, Nagaokakyo; Shigenori Yagi, Nagoya, all of Japan

[73] Assignee: Mitsubishi Denki Kabushiki Kaisha, Tokyo, Japan

[21] Appl. No.: 361,478

[22] Filed: Dec. 22, 1994

Related U.S. Application Data

[63] Continuation of Ser. No. 203,615, Feb. 28, 1994, abandoned, and a continuation of Ser. No. 904,030, Jun. 25, 1992, abandoned.

[30] Foreign Application Priority Data

Jun. 27, 1991 [JP] Japan ................................... 3-156804
Oct. 4, 1991 [JP] Japan ................................... 3-258032

[51] Int. Cl.$^6$ ............................................. G11B 11/00
[52] U.S. Cl. ............................ 369/13; 360/114; 369/112
[58] Field of Search .......................... 369/13, 109, 102, 369/100, 14; 360/59, 114; 372/22, 21; 359/328

[56] References Cited

U.S. PATENT DOCUMENTS

| | | | |
|---|---|---|---|
| 3,651,281 | 3/1972 | Becker | 360/59 |
| 4,731,795 | 3/1988 | Clark et al. | 372/107 |
| 4,935,913 | 6/1990 | Shinoda | 369/54 |
| 5,038,352 | 8/1991 | Lenth et al. | 372/21 |
| 5,060,233 | 10/1991 | Harder et al. | 372/22 |
| 5,093,832 | 3/1992 | Bethune et al. | 372/21 |
| 5,111,468 | 5/1992 | Kozlovsky et al. | 372/22 |
| 5,172,369 | 12/1992 | Chikuma et al. | 369/112 |

FOREIGN PATENT DOCUMENTS

| | | |
|---|---|---|
| 0289304 | 4/1988 | European Pat. Off. . |
| 0378061 | 12/1989 | European Pat. Off. . |
| 0383386 | 2/1990 | European Pat. Off. . |
| 3095742 | 4/1991 | European Pat. Off. . |
| 3235238 | 10/1991 | European Pat. Off. . |

OTHER PUBLICATIONS

"High Speed Overwritable Magneto–Optic Recording" vol. 26 (1987) pp. 149–154.
"A Triple–Density Optical Disk System Using a Frequency–Double Nd:YAG Laser" SPIE vol. 1139—pp. 149–154.
"Characteristics of Optical Second–harmonic Generation due to Cerenkov–radiation–type phase matching" K. Chikuma and S. Umegaki J. Opt. Soc. Am. B/vol. 7, No. 5/May 1990.

*Primary Examiner*—Georgia Y. Epps
*Assistant Examiner*—Tan Dinh

[57] ABSTRACT

The second harmonic wave of a solid laser light which is emitted from a second harmonic wave light source is divided into a plurality of laser beams by a diffraction grating. The divided laser beams are converged on a record carrier into a plurality of light spots by an optical head. Magnetic field generating coils for applying magnetic fields to the respective light spots in accordance with the recording signals from a signal line are disposed under the record carrier. Part of the solid laser light is reflected and input to a beam splitter. Since part of the light input to the beam splitter is taken out, a stabilizer controls the output of the solid laser light from the second harmonic wave light source, parallel recording/reproduction using the plurality of light spots which are arranged on the record carrier is enabled and the formation of the plurality of light spots is effectively controlled. Thus, a magneto-optical recording and reproducing apparatus which is capable of high-density recording and high-speed data transfer, which supplies a stable and accurate optical output, and which facilitates the control of the optical output is provided.

19 Claims, 12 Drawing Sheets

MAGNETO-OPTICAL RECORDING AND REPRODUCING APPARATUS

This application is a continuation of application Ser. No. 08/203,615 filed on Feb. 28, 1994, now abandoned, and Ser. No. 07/904,030 filed on Jun. 25, 1992, now abandoned.

BACKGROUND OF THE INVENTION

1. Field of the Invention

The present invention relates to a magneto-optical recording and reproducing apparatus and, more particularly, to an improvement in the high-density magneto-optical recording means of a magneto-optical recording and reproducing apparatus of a magnetic field modulation system.

2. Description of the Related Art

In a magneto-optical recording and reproducing apparatus, an information recording signal is recorded by varying the direction of magnetization of a magneto-optical recording thin film which is made of Gd·TbFe, Gd·Co or other similar material by applying a magnetic field and semiconductor laser light to the magnetic thin film. In reproducing a recorded signal, the magnetic thin film is irradiated with linearly polarized laser light, and the recorded signal is read out by utilizing the rotation of the plane of polarization of the linearly polarized light in accordance with the direction of magnetization due to the Kerr magneto-optical effect or the Faraday effect. The Kerr magneto-optical effect refers to the tendency of the light reflected by the surface of a recording medium to rotate, and the Faraday effect refers to the tendency of the light passing through a recording medium to rotate.

A magneto-optical recording and reproducing apparatus enables not only rewriting by way of erasure or overwriting like a magnetic recording and reproducing apparatus but also writing and reproduction at a high speed. In addition, a magneto-optical recording and reproducing apparatus has a memory with a large capacity. Therefore, much is expected of a magneto-optical recording and reproducing apparatus as an apparatus for recording and reproducing picture and other information.

The following two methods are conventionally known as a system for writing a recording signal in a magneto-optical recording and reproducing apparatus.

A first recording system is what is called a light modulation system. This is a system for recording information by irradiating the surface of a recording medium consisting of a magnetic thin film with laser light which is modulated in accordance with a recording signal. In the first recording system, namely, the light modulation system, the magnetization sensitivity of a recording medium is generally enhanced by the application of an unmodulated magnetic field to the surface of the recording medium simultaneously with irradiation by laser light, and it is possible to record with comparatively weak laser light.

A second recording system called a magnetic field modulation system. This is a system for recording information by irradiating the surface of a recording medium consisting of a magnetic thin film (magneto-optical recording film) with unmodulated laser light and simultaneously applying a modulated magnetic field thereto in accordance with a recording signal. In the second recording system, namely, the magnetic field modulation system, information is recorded only at the portion which is irradiated with laser light because the magnetic field applied to the surface of the recording medium is so weak that recording with its own field strength is impossible. The magnetic field is generated by applying a current corresponding to the recording signal to the wire in the vicinity of a recording portion.

FIG. 1 shows the functional structure of a conventional high-density magneto-optical recording and reproducing apparatus of a magnetic field modulation system.

This apparatus is composed of a laser light source 10 for generating semiconductor laser light, a laser driver 12 for driving the laser light source 10, and a signal line L1 for supplying a signal to the laser driver 12. The laser light emitted from the laser light source 10 is controlled in accordance with a control signal which is supplied to the laser driver 12 through the signal line L1.

The apparatus is further composed of a reflecting mirror 14 for changing the optical path of the laser light emitted from the laser light source 10, an optical head 15 having an objective lens 15a for converging the laser light into the form of a spot, a driving motor 17 for driving a record carrier 16 at a predetermined rotational speed, and a beam splitter 18 disposed between the reflecting mirror 14 and the laser light source 10. The beam splitter 18 has the function of splitting the laser beam reflected by the record carrier 16. The reflected light which has passed through the beam splitter 18 is received by a reproducing optical system 19, wherein the focusing state, the tracking state and a reproducing signal are detected. The reproducing optical system 19 is composed of, for example, a condenser lens, a wave plate (polarizing plate) and a light receiving element (photoelectric conversion element) such as a CCD.

A magnetic field applying means for applying a magnetic field, which has its polarity inverted or strength modulated in accordance with recording information, to the record carrier 16 including a magneto-optical recording film, is composed of a magnetic field generating coil 20 for applying a magnetic field to the record carrier 16 at the time of irradiation by a laser beam, a coil driver 21 for driving the magnetic field generating coil 20, and a signal line L2 for supplying a recording signal to the coil driver 21.

In the conventional apparatus having the above-described structure, the magnetic field of the coil 20 is modulated in accordance with a recording signal which is supplied to the coil driver 21 through the signal line L2, and the recording signal is recorded in the record carrier 16 by a laser beam which is controlled in accordance with the control signal which is supplied through the signal line L1.

The record carrier 16 including the magneto-optical recording film is irradiated with the laser beam which is converged in the shape of a spot by the objective lens 15a, and at the same time the magnetic field which is generated by the magnetic field generating coil 20 and modulated in accordance with the recording signal supplied through the signal line L2 is applied to the record carrier 16.

Although the laser beam with which the record carrier 16 is irradiated is controlled in accordance with the control signal which is supplied to the laser driver 12 through the signal line L1, it is not modulated. On the other hand, the magnetic field applied to the record carrier 16 by the magnetic field generating coil 20 is modulated in accordance with a recording signal which is supplied to the coil driver 21 for driving the magnetic field generating coil 20.

Information is therefore recorded in the record carrier 16 by modulating the magnetic field which is applied to the record carrier 16. The strength of the magnetic field which is applied to the surface of the recording medium at the time of recording is so weak that recording with its own field strength is impossible. Information is therefore recorded only at the portion which is irradiated with the laser beam.

In order to enhance the recording density of such a magneto-optical recording and reproducing apparatus of a magnetic field modulation system, it is necessary to reduce the diameter of the light spot which is used for recording and reproduction.

In overwriting in a conventional magnetic field modulation system which directly uses semiconductor laser light, the reduction in light spot diameter which is set when the light spot is formed on the surface of a recording medium by semiconductor laser light is greatly restricted by the semiconductor laser oscillation wavelength. For example, in an AlGaIn semiconductor laser, which has been reported to oscillate light at the shortest wavelength, it is said to be theoretically possible to obtain a semiconductor laser oscillation wavelength of 580 nm (0.58 μm).

The light spot diameter ω is generally obtained from the formula for obtaining the first dark ring of the Airy disk as follows:

$$\omega = 1.22 \times \lambda / NA$$

wherein λ represents the wavelength of the light source, and NA the aperture of the objective lens. If the aperture NA of the objective lens is 0.6, for example, the light spot diameter ω obtained by using the above-described semiconductor laser light having a wavelength of 580 nm (0.58 μm) is calculated from the above-described Airy's formula as follows:

$$\omega = 1.22 \times \lambda / NA = 1.18 \; \mu m.$$

The thus-obtained diameter 1.18 μm is the minimum light spot diameter in practical use. However, the light spot diameter of 1.18 μm cannot be said to be adequately small for enhancing the recording density of a magneto-optical recording and reproducing apparatus and increasing the data transferring speed by reducing the recording bit length. It is therefore necessary to produce a magneto-optical recording and reproducing apparatus which is capable of magneto-optical recording and reproduction with a smaller light spot diameter.

SUMMARY OF THE INVENTION

Accordingly, it is a first object of the present invention to eliminate the above-described problems in the related art and to provide a magneto-optical recording and reproducing apparatus which is capable of magneto-optical recording and reproduction with a smaller light spot diameter than 1.18 μm.

Since the reduction in light spot diameter has its limit, a method of enhancing the characteristics of a magneto-optical recording and reproducing apparatus also has its limit which is physically prescribed. It is therefore very difficult to greatly increase the data transferring speed.

Accordingly, it is a second object of the present invention to provide a magneto-optical recording and reproducing apparatus which is provided with a means for enabling high-density recording and high-speed data transfer in addition to a means for reducing the light spot diameter.

In a magneto-optical recording and reproducing apparatus having a means for reducing the light spot diameter or a means for realizing high-density recording and high-speed data transfer in addition to a means for reducing the light spot diameter, a structure for monitoring the light emitted from the light source is necessary in order to stabilize the optical output with high accuracy or to control the optical output with high accuracy.

Accordingly, it is a third object of the present invention to provide a magneto-optical recording and reproducing apparatus which is provided with a means for reducing the light spot diameter and a means for enabling high-density recording and high-speed data transfer, and which is capable of supplying a stable and accurate optical output and easily controlling the optical output.

To achieve the first object, a magneto-optical recording and reproducing apparatus provided in a first aspect of the present invention is characterized in that the light spot diameter is reduced by adopting a system for recording and reproducing information in a magnetic field modulation system which uses the second harmonic wave of semiconductor-laser-pumped solid laser light. According to this magneto-optical recording and reproducing apparatus, it is possible to reduce the recording bit length by a single light spot, thereby enabling the enhancement of the recording density and the data transferring speed.

The magneto-optical recording and reproducing apparatus provided in the first aspect of the present invention is a magneto-optical recording and reproducing apparatus for recording information at the portion of a record carrier which is irradiated with a laser beam by applying a magnetic field which has its polarity inverted or strength modulated in accordance with the recording information to the record carrier and by irradiating the record carrier with the laser beam. The magneto-optical recording and reproducing apparatus comprises at least: a second harmonic wave light source for emitting the second harmonic wave of semiconductor-laser-pumped solid laser light; a spot forming means for introducing the second harmonic wave to a predetermined position on the record carrier so as to form a light spot; and a magnetic field applying means for applying a magnetic field which has its polarity inverted or strength modulated in accordance with recording information to the record carrier.

To achieve the second object of the present invention, a magneto-optical recording and reproducing apparatus provided in a second aspect of the present invention comprises: a second harmonic wave light source for emitting the second harmonic wave of semiconductor-laser-pumped solid laser light as a light source for an optical head; a diffraction grating disposed between the second harmonic wave light source and a record carrier; and a magnetic field applying means for applying a magnetic field to the laser beam which is split by the diffraction grating.

To achieve the third object of the present invention, a magneto-optical recording and reproducing apparatus provided in a third aspect of the present invention comprises: a second harmonic wave light source for emitting the second harmonic wave of semiconductor-laser-pumped solid laser light; a beam splitter disposed between the second harmonic wave light source and a record carrier so as to reflect part of the second harmonic component; a light detector for receiving the light reflected by the beam splitter; and a control means for controlling the emission of the semiconductor-laser-pumped solid laser light on the basis of the output of the light detector.

In the magneto-optical recording and reproducing apparatus provided in the second aspect of the present invention, the emission of the semiconductor-laser-pumped solid laser light is preferably controlled by controlling the semiconductor laser driving current or the temperature of the semiconductor laser element in the solid laser pumping semiconductor laser which generates the semiconductor-laser-pumped solid laser light so as to control the intensity or the oscillation wavelength of the light emitted from the solid laser pumping semiconductor laser.

The wavelength of the light emitted from the light source is preferably not more than 600 nm in the magneto-optical recording and reproducing apparatus of the present invention.

In order to operate the magneto-optical recording and reproducing apparatus of the present invention effectively, it is preferable to further strictly select the laser light emitted from the second harmonic wave light source for emitting the second harmonic wave of semiconductor-laser-pumped solid laser light. For this purpose, a passing light selecting means which allows only the second harmonic wave of semiconductor-laser-pumped solid laser light to pass therethrough is provided. The passing light selecting means is composed of a band pass filter, an interference filter, a colored glass filter or similar filler.

In the magneto-optical recording and reproducing apparatus provided in the first aspect of the present invention, the second harmonic wave of laser light is emitted from the second harmonic wave light source. The secondary harmonic wave emitted from the secondary harmonic wave light source is introduced to the spot forming means so as to form a light spot at a predetermined position on the record carrier. Since a magnetic field, which has its polarity inverted or strength modulated in accordance with recording information, is applied to the record carrier, the information is recorded (overwritten) at the portion of the record carrier which is irradiated with the laser beam.

In the magneto-optical recording and reproducing apparatus provided in the second aspect of the present invention, the second harmonic wave of semiconductor-laser-pumped solid laser light is emitted from the second harmonic wave light source. The second harmonic wave emitted from the second harmonic wave light source is split into a plurality of beams by the diffraction grating. The plurality of beams emitted from the diffraction grating are introduced and converged onto predetermined positions on the record carrier by the optical head so as to form beam spots on the respective positions. Since the magnetic field applying means corresponding to the respective positions are provided, it is possible to simultaneously apply magnetic fields to the plurality of light spots by applying the corresponding magnetic fields which have their polarities inverted or strengths modulated in accordance with recording information.

If the plurality of light spots are arranged on the tracks adjacent to each other in the radial direction of the record carrier, parallel recording/reproduction is facilitated.

In the magneto-optical recording and reproducing apparatus provided in the third aspect of the present invention, the second harmonic wave of semiconductor-laser-pumped solid laser light is emitted from the second harmonic wave light source. Part of the second harmonic wave emitted from the second harmonic wave light source is reflected by the beam splitter. The part of the second harmonic wave reflected and emitted from the beam splitter is received by the light detector so as to detect the intensity thereof. The value of the intensity of the light detected by the light detector is transferred to the control means, and the control means controls the emission of the second harmonic wave of the semiconductor-laser-pumped solid laser light on the basis of the detected value.

If the wavelength of the light emitted from the light source is set at not more than 600 nm, the wavelength of the emitted light is controlled by the light source itself. If the passing light selecting means composed of a band pass filter, an interference filter, a colored glass filter or similar filter is provided, it is possible to further select the second harmonic wave component from the laser light emitted from the second harmonic wave light source.

A semiconductor-laser-pumped solid laser light source used as the second harmonic wave light source preferably has one of the following structures.

A first example of the semiconductor-laser-pumped solid laser light source used as the second harmonic wave light source is composed of a semiconductor laser for producing excitation light, a solid laser medium having a section sufficiently small with respect to the spread of the excitation light, and a laser resonator for emitting laser light from the solid laser medium. The angle formed between the end surface of the solid laser medium on the optical axis of the laser light and the optical axis of oscillated laser light is a Brewster angle.

A second example of the light source has the same structure as the first example except that the optical axis of the laser light is coaxial with the optical axis of the excitation light.

A third example of the light source has the same structure as the second example except that the excitation light incident end surface of the solid laser medium is perpendicular to the laser light and is coated so as to cause total reflection, and that the laser light is propagated rectilinearly in the solid laser medium.

A fourth example of the light source has the same structure as the second example except that the excitation light incident end surface of the solid laser medium is perpendicular to the laser light and is coated so as to cause total reflection, and that the laser light is zigzagged in the solid laser medium by utilizing the total reflection of the side surface of the solid laser medium.

A fifth example of the light source has the same structure as the fourth example except that the angle formed between the excitation light incident end surface of the solid laser medium and the optical axis of the excitation light at the wavelength of the excitation light is a Brewster angle.

A sixth example of the light source has the same structure as the first example except that the optical axis of the laser light is approximately perpendicular to the optical axis of the excitation light.

A seventh example of the light source has the same structure as the first example except that a higher harmonic wave generating element is provided in the resonator.

An eighth example of the light source has the same structure as the seventh example except that the angle formed between the end surface of the higher harmonic wave generating element and the optical axis of the laser light is a Brewster angle.

A ninth example of the light source has the same structure as the seventh example except that the length and the temperature of the higher harmonic wave generating element are adjusted so that the higher harmonic wave generating element constitutes a half-wave plate with respect to the laser light.

In all of the examples of the light source, since the end surface of the solid laser medium forms a Brewster angle, in the beam which can be oscillated, the polarized light component in the direction parallel to the plane formed by the optical axis of the laser light and the normal line of the end surface of the solid laser medium has the maximum transmittance for the end surface, and the polarized light in this direction is selectively oscillated.

The above and other objects, features and advantages of the present invention will become clear from the following description of a preferred embodiments thereof, taken in conjunction with the accompanying drawings.

DESCRIPTION OF THE PREFERRED EMBODIMENTS

An embodiment of the present invention will be explained hereinunder with reference to the accompanying drawings.

Figure 2:
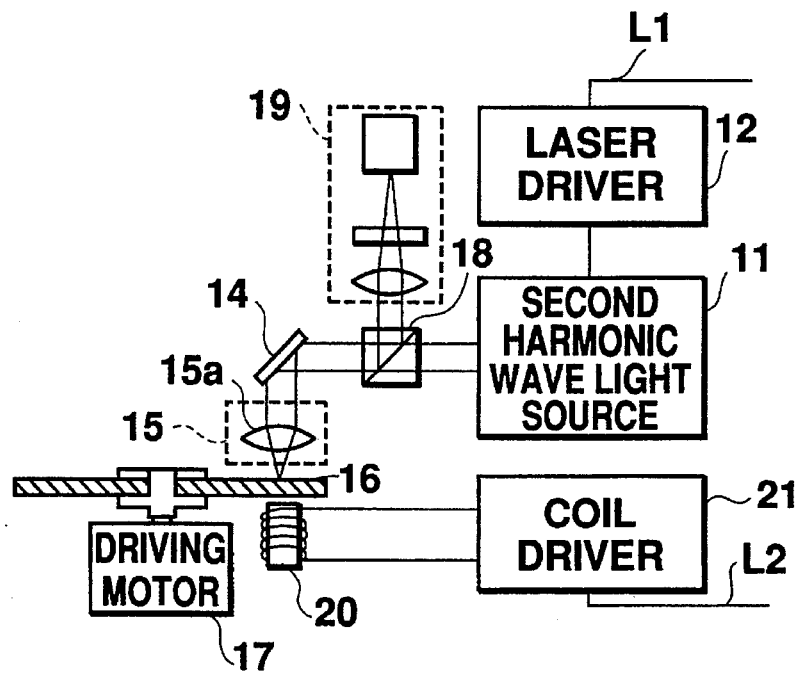
FIG. 2 schematically shows the functional structure of a first embodiment of a magneto-optical recording and reproducing apparatus according to the present invention.

FIG. 2 schematically shows the functional structure of a first embodiment of a magneto-optical recording and reproducing apparatus according to the present invention.

The magneto-optical recording and reproducing apparatus of the first embodiment is composed of a second harmonic wave light source 11 for generating the second harmonic wave of semiconductor-laser-pumped solid laser light, a pumping semiconductor laser driver 12 for driving the second harmonic wave light source 11, and a signal line L1 for supplying a signal to the semiconductor laser driver 12. The laser beam emitted from the second harmonic wave light source 11 is controlled in accordance with the control signal which is supplied to the semiconductor laser driver 12 through the signal line L1. The wavelength of the second harmonic wave emitted from the second harmonic wave light source 11 is set at not more than 600 nm.

The magneto-optical recording and reproducing apparatus of the first embodiment is further composed of a reflecting mirror 14 for changing the optical path of the laser beam, an optical head 15 having an objective lens 15a for converging the laser beam into the form of a spot, a driving motor 17 for driving a record carrier 16 at a predetermined rotational speed, and a beam splitter 18 disposed between the reflecting mirror 14 and the second harmonic wave light source 11. The beam splitter 18 has a function of splitting the laser beam reflected by the record carrier 16. The reflected light which has passed through the beam splitter 18 is received by a reproducing optical system 19, wherein the focusing state, the tracking state and a reproducing signal are detected. The reproducing optical system 19 is composed of, for example, a condenser lens, a wave plate (polarizing plate) and a light receiving element (photoelectric conversion element) such as a CCD.

A magnetic field applying means for applying a magnetic field which has its polarity or strength modulated in accordance with recording information to the record carrier 16 including a magneto-optical recording film, is composed of a magnetic field generating coil 20 for applying a magnetic field to the record carrier 16 at the time of irradiation by a laser beam, a coil driver 21 for driving the magnetic field generating coil 20, and a signal line L2 for supplying a recording signal to the coil driver 21.

In the magneto-optical recording and reproducing apparatus of the first embodiment having the above-described structure, the magnetic field of the coil 20 is modulated in accordance with the recording signal which is supplied to the coil driver 21 through the signal line L2, and the recording signal is recorded in the record carrier 16 by a laser beam which is controlled in accordance with the control signal which is supplied through the signal line L1.

The record carrier 16 including the magneto-optical recording film is irradiated with the laser beam which is converged in the form of a spot by the objective lens 15a in the optical head 15, and at the same time the magnetic field which is generated by the magnetic field generating coil 20 and modulated in accordance with the recording signal supplied through the signal line L2 is applied to the record carrier 16.

Although the laser beam with which the record carrier 16 is irradiated is controlled in accordance with the control signal which is supplied to the laser driver 12 through the signal line L1, it is not modulated. On the other hand, the magnetic field applied to the record carrier 16 by the magnetic field generating coil 20 is modulated in accordance with the recording signal which is supplied to the coil driver 21 for driving the magnetic field generating coil 20.

Information is therefore recorded in the record carrier 16 by modulating the magnetic field which is applied to the record carrier 16. The strength of the magnetic field which is applied to the surface of the recording medium at the time of recording is so weak that recording with its own field strength is impossible. Information is therefore recorded only at the portion which is irradiated with the laser beam. In this way, the magneto-optical recording and reproducing apparatus of the first embodiment can reduce the oscillation wavelength by using a second harmonic wave obtained due to a nonlinear optical effect of the laser beam emitted from the light source. For this reason, reduction in the light spot diameter is realized, resulting in the enhancement of the recording density.

Figure 3:
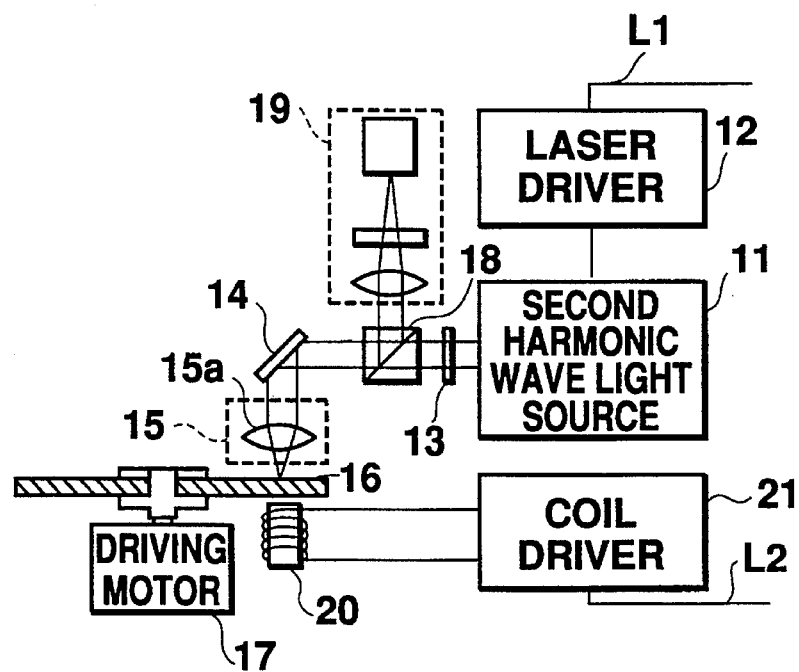
FIG. 3 schematically shows the functional structure of a second embodiment of a magneto-optical recording and reproducing apparatus according to the present invention.

FIG. 3 schematically shows the functional structure of a second embodiment of a magneto-optical recording and reproducing apparatus according to the present invention. The same numerals are provided for the elements which are the same as those in the first embodiment, and explanation thereof will be omitted.

The characteristic feature of the second embodiment lies in the fact that a passing light selecting means 13 which is composed of a band pass filter, an interference filter, a colored glass filter or similar filter is disposed between the second harmonic wave light source 11 and the beam splitter 18 so as to select the second harmonic wave emitted from the second harmonic wave light source 11. Because of this passing light selecting means 13, the laser light except the second harmonic wave of semiconductor-laser-pumped solid laser light having a wavelength of not more than 600 nm is removed from the laser light emitted from the second harmonic wave light source 11, so that only the second harmonic wave of semiconductor-laser-pumped solid laser light having a wavelength of not more than 600 nm is supplied to the record carrier 16. In this way, the laser light except the second harmonic wave having a wavelength of not more than 600 nm, which is one obstacle to the reduction in the diameter of the light spot formed on the record carrier 16 and, hence, the enhancement of the recording density, is safely removed. It is therefore possible to realize the reduction in the diameter of the light spot formed on the record carrier 16 and, as a result, to enhance the recording density.

The passing light selecting means 13 used in the second embodiment is not restricted to a band pass filter, an interference filter or a colored glass filter, and any means may be used so long as it can remove the laser light except the second harmonic wave of semiconductor-laser-pumped solid laser light having a wavelength of not more than 600 nm.

Figure 4:
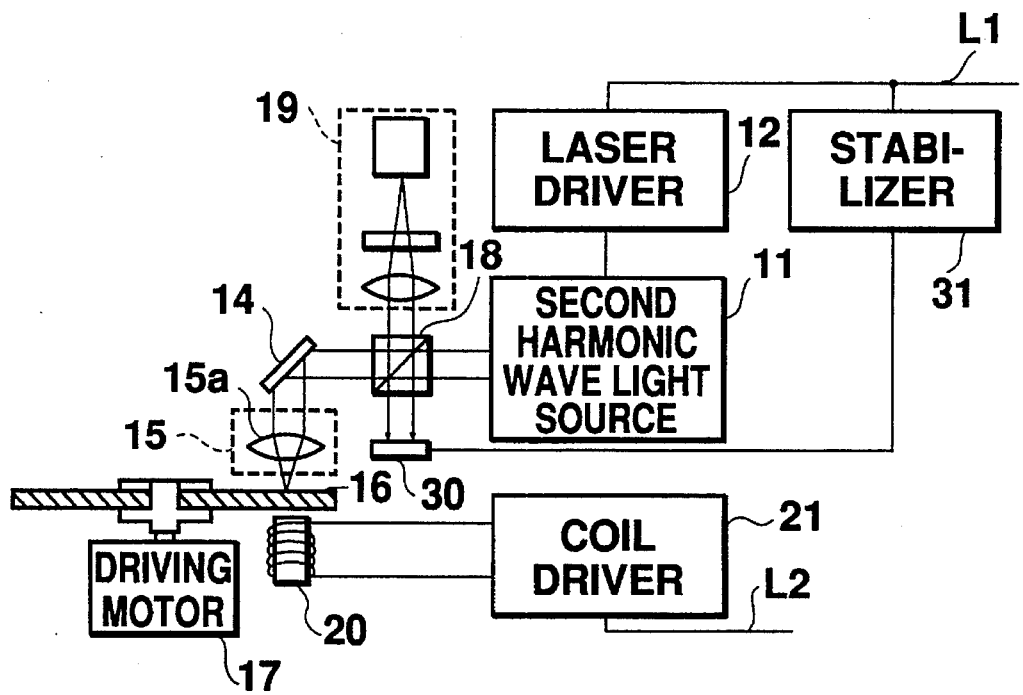
FIG. 4 schematically shows the functional structure of a third embodiment of a magneto-optical recording and reproducing apparatus according to the present invention.

FIG. 4 schematically shows the functional structure of a third embodiment of a magneto-optical recording and reproducing apparatus according to the present invention. The same numerals are provided for the elements which are the same as those in the first embodiment or the second embodiment, and explanation thereof will be omitted.

The characteristic feature of the third embodiment lies in the fact that a beam splitter 18 for reflecting part of the second harmonic wave of solid laser light which is emitted from the second harmonic wave light source 11, a light detector 30 for receiving the second harmonic wave of the solid laser light which is reflected by the beam splitter 28, and a stabilizer 31 for controlling the output of the solid laser pumping semiconductor laser in the second harmonic wave light source 11 are provided.

In the same way as in the first embodiment, the intensity of the semiconductor laser light for pumping a semiconductor-laser-pumped solid laser (hereinunder referred to as "solid laser pumping semiconductor laser light") which generates the solid laser light is first controlled in the semiconductor laser driver 12 in accordance with the control signal through the signal line L1, and the second harmonic wave of the solid laser light corresponding to the intensity is emitted from the second harmonic wave light source 11. The third embodiment is different from the first embodiment in that the stabilizer 31 connected to the signal line L1 controls the semiconductor laser driving current or the temperature of the semiconductor laser element in the solid laser pumping semiconductor laser so as to control the intensity or the oscillation wavelength of the light emitted from the solid laser pumping semiconductor laser, which results in the control of the intensity of the second harmonic wave of the solid laser light emitted from the second harmonic wave light source 11. In the third embodiment, the wavelength of the second harmonic wave of the solid laser light emitted from the second harmonic wave light source 11 is also set at not more than 600 nm.

Since the principle and the recording and reproducing operation of the magneto-optical recording and reproducing apparatus according to the present invention is the same as those of the conventional magneto-optical recording and reproducing apparatus of the magnetic field modulation system using a semiconductor laser as the light source, explanation thereof will be omitted, and a method of stabilizing fluctuation of the optical output produced in the second harmonic wave component emitted from the light source will be explained hereinunder.

A fluctuation in the optical output is produced by various causes. In the structure for generating a second harmonic wave of the solid laser light which is produced as a fundamental wave by a nonlinear optical element which is disposed on the inside or the outside of a solid laser light resonator, a fluctuation in the optical output of the solid laser light directly influences the light source, and this is the main cause of a fluctuation in the second harmonic wave output.

However, a fluctuation in the optical output of a solid laser is frequently caused by a fluctuation in the optical output of a pumping semiconductor laser or a fluctuation in the optical output of the fundamental wavelength of solid laser light in addition to a fluctuation in the optical resonator. A fluctuation in the optical output of the fundamental wavelength of solid laser light is eliminated by controlling the optical output of the oscillation wavelength of a pumping semiconductor laser. By utilizing this, it is possible to eliminate the fluctuation in the optical output of the second harmonic wave which is caused by an error of the optical output of the second harmonic wave of the solid laser light which is produced as a fundamental wave.

It is therefore possible to achieve the stabilization of an optical output by controlling the optical output or the oscillation wavelength of a pumping semiconductor laser as in the structure of the third embodiment, thereby producing a magneto-optical recording and reproducing apparatus having higher accuracy, a higher density and a larger capacity than a conventional one.

Although the third embodiment is applied to a rewriting optical disk apparatus of a magnetic field modulation system, the present invention is not restricted thereto and it is naturally possible to apply the third embodiment to an optical disk exclusively for reproduction or a rewriting optical disk of a light modulation system.

Figure 5:
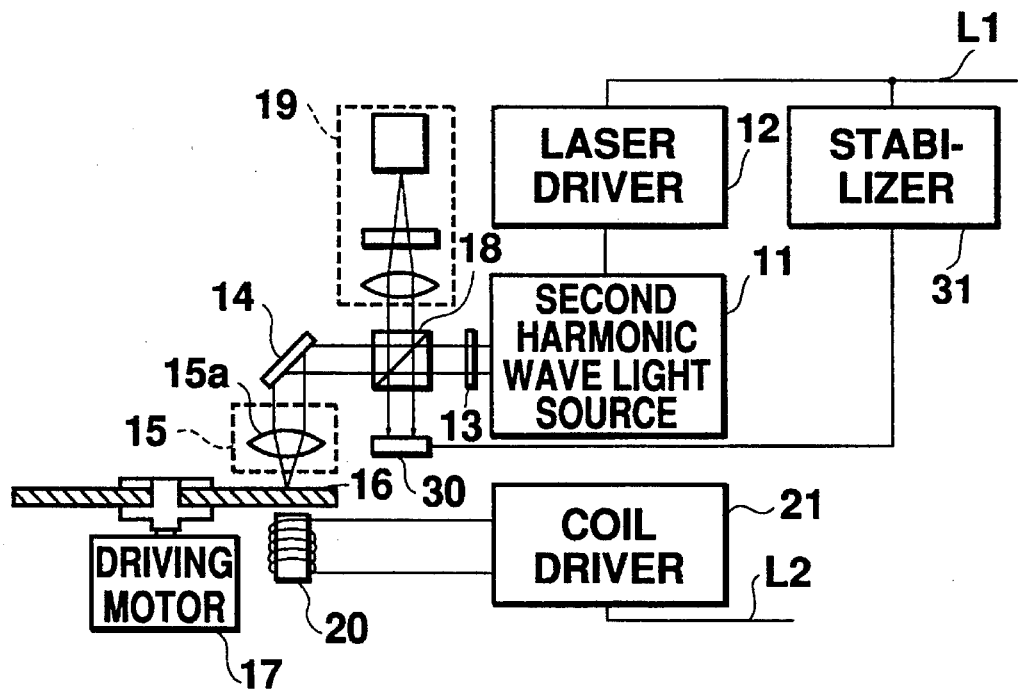
FIG. 5 schematically shows the functional structure of a fourth embodiment of a magneto-optical recording and reproducing apparatus according to the present invention.

FIG. 5 schematically shows the functional structure of a fourth embodiment of a magneto-optical recording and reproducing apparatus according to the present invention. The same numerals are provided for the elements which are the same as those in the second or third embodiment, and explanation thereof will be omitted.

The fourth embodiment is a combination of the second embodiment and the third embodiment. The magneto-optical recording and reproducing apparatus of the fourth embodiment is provided both with the second harmonic wave light source 11 and the passing light selecting means 13, which are characteristic of the second embodiment, and with the beam splitter 28, the light detector 30 and the stabilizer 31, which are characteristic of the third embodiment. In the fourth embodiment, the wavelength of the second harmonic wave of the solid laser light emitted from the second harmonic wave light source 11 is also set at not more than 600 nm.

In the magneto-optical recording and reproducing apparatus of the fourth embodiment, the second harmonic wave emitted from the second harmonic wave light source 11 is selected by the passing light selecting means 13 disposed between the second harmonic wave light source 11 and the beam splitter 18 in the same way as in the second embodiment. Because of this passing light selecting means 13, the laser light except the second harmonic wave of semiconductor-laser-pumped solid laser light having a wavelength of not more than 600 nm is removed from the laser light emitted from the second harmonic wave light source 11, so that only the second harmonic wave of semiconductor-laser-pumped solid laser light having a wavelength of not more than 600 nm is supplied to the record carrier 16. Part of the second harmonic wave of the solid laser light emitted from the second harmonic wave light source 11 is reflected by the beam splitter 18, which is the same as that in the third embodiment. Since the magneto-optical recording and reproducing apparatus of this embodiment is provided with the light detector 30 and the stabilizer 31 as in the third embodiment, it is possible to effectively control the formation of the light spot so that the reduction in the diameter of the light spot formed on the record carrier 16 is secured and the enhancement of the recording density is also secured.

Figure 6:
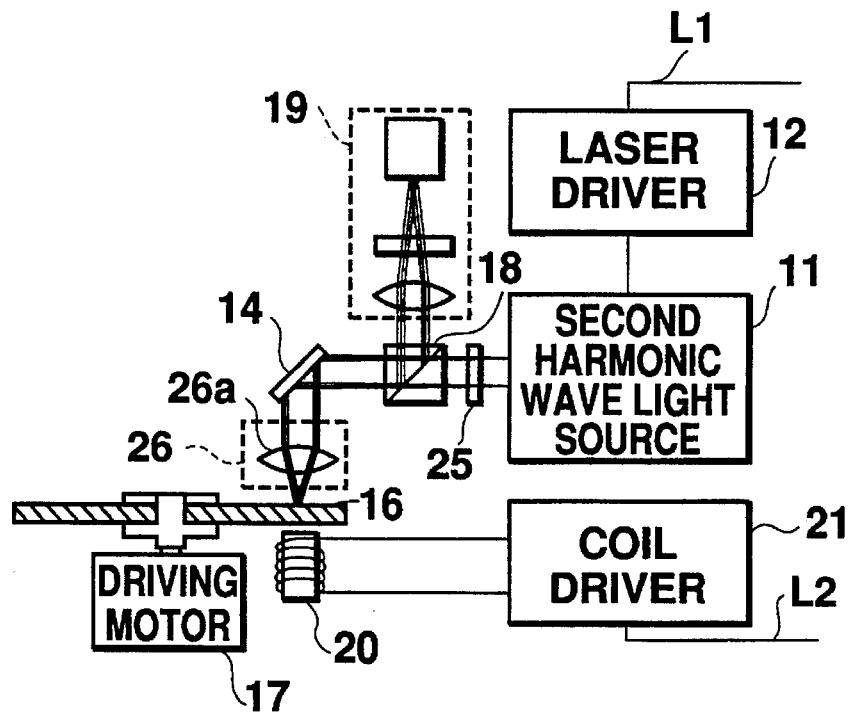
FIG. 6 schematically shows the functional structure of a fifth embodiment of a magneto-optical recording and reproducing apparatus according to the present invention.

FIG. 6 schematically shows the functional structure of a fifth embodiment of a magneto-optical recording and reproducing apparatus according to the present invention.

Figure 1:
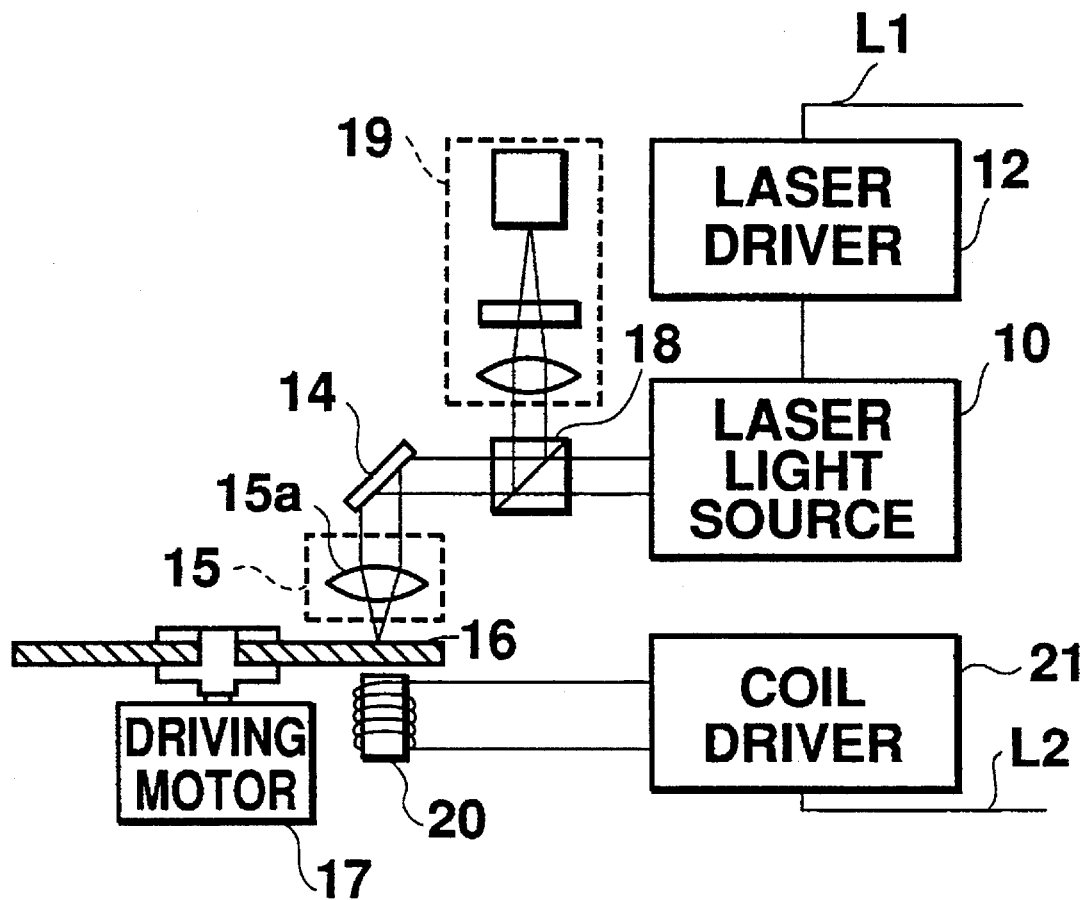
FIG. 1 schematically shows an example of the structure of a conventional magneto-optical recording and reproducing apparatus.

This embodiment is the same as the conventional apparatus shown in FIG. 1 in the respect that the second harmonic wave light source 11 for semiconductor-laser-pumped solid laser light, the pumping semiconductor laser driver 12 for driving the second harmonic wave light source 11 and the signal line L1 for supplying a signal to the semiconductor laser driver 12 are provided. In the fifth embodiment, the second harmonic wave light source 11 is so composed as to emit the second harmonic wave of semiconductor-laser-pumped solid laser light (hereinunder referred to as "solid laser light") by disposing a nonlinear element within the resonator of the semiconductor-laser-pumped solid laser.

The second harmonic wave of solid laser light is therefore emitted from the second harmonic wave light source 11 in accordance with the control signal supplied from the signal line L1. In the fifth embodiment, the wavelength of the second harmonic wave of the solid laser light emitted from the second harmonic wave light source 11 is also set at not more than 600 nm.

In the fifth embodiment, however, the second harmonic wave of the solid laser light emitted from the second harmonic wave light source 11 is divided into a plurality of laser beams by a laser beam splitting means, namely, a diffraction grating 25 disposed between the second harmonic wave light source 11 and the beam splitter 18.

The magneto-optical recording and reproducing apparatus of the fifth embodiment is further provided with the reflecting mirror 14 for changing the optical path of the laser beam emitted from the beam splitter 18. The plurality of laser beams reflected by the reflecting mirror 14 are input to an optical head 26 disposed at the subsequent stage of the reflecting mirror 14 and are converged by an objective lens 26a provided in an optical head 26 so as to form a plurality of light spots. The plurality of light spots formed in this manner are simultaneously projected onto the record carrier 16 including a magneto-optical recording film. A light passing selecting means 13a composed of a band pass filter, an interference filter, a colored glass filter or similar filter is pasted to the diffraction grating 25 so as to select the second harmonic wave emitted from the second harmonic wave light source 11 in the same way as in the second embodiment. Because of this passing light selecting means 13a, the laser light except the second harmonic wave of semiconductor-laser-pumped solid laser light having a wavelength of not more than 600 nm is removed from the laser light emitted from the second harmonic wave light source 11, so that only the second harmonic wave of semiconductor-laser-pumped solid laser light having a wavelength of not more than 600 nm is supplied to the optical head 26. In this way, the laser light except the second harmonic wave having a wavelength of not more than 600 nm, which is one obstacle against the reduction in the diameter of the light spot formed on the record carrier 16 and, hence, the enhancement of the recording density, is safely removed. It is therefore possible to realize the reduction in the diameter of the light spot formed on the record carrier 16 and, as a result, to enhance the recording density.

The reflected light which has passed through the beam splitter 18 is received by the reproducing optical system 19 composed of, for example, a condenser lens, a wave plate (polarizing plate) and a light receiving element (photoelectric conversion element) such as a CCD, wherein the focusing state, the tracking state and a reproducing signal are detected in the same way as in the related art.

The record carrier 16 is provided with the driving motor 17 for driving the record carrier 16 at a predetermined rotational speed. Under the record carrier 16 are provided the magnetic field generating coil 20 for applying a magnetic field to the record carrier 16 at the time of irradiation by a laser beam, the coil driver 21 for driving the magnetic field generating coil 20, and the signal line L2 for supplying a recording signal to the coil driver 21. In this way, a magnetic field the polarity of which is inverted or the strength of which is modulated in accordance with recording information is applied to the record carrier 16.

Figure 7:
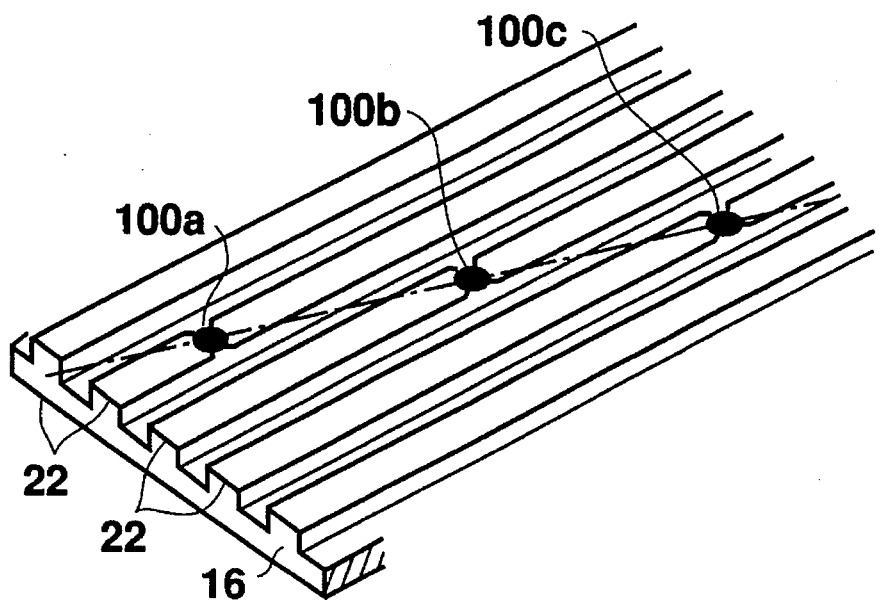
FIG. 7 schematically shows the arrangement of the light spots on the record carrier in the fifth embodiment shown in FIG. 6.

FIG. 7 schematically shows the arrangement of the light spots on the record carrier 16.

In FIG. 7, the enlarged magneto-optical recording surface of the record carrier 16 is shown. A plurality of information recording tracks 22 are formed on the magneto-optical recording surface of the record carrier 16, as shown in FIG. 7. Laser beam spots 100a, 100b and 100c converged on the information recording tracks 22 are so directed as to be arranged in alignment on the tracks 22 adjacent to each other, as shown in FIG. 7. Magnetic heads (not shown) corresponding to the laser beam spots 100a, 100b and 100c are disposed at the corresponding positions.

The principle and the recording and reproducing operation of the magneto-optical recording and reproducing apparatus according to the present invention is the same as those of a conventional magneto-optical recording and reproducing apparatus. An information recording signal is recorded by varying the direction of magnetization of a magneto-optical recording film which is made of Gd·TbFe, Gd·Co, or the like by applying semiconductor laser light and a weak magnetic field to the magneto-optical recording film. In reproducing a recorded signal, the magnetic thin film is irradiated with linearly polarized laser light, and the recorded signal is read out by the reproducing optical system 19 by utilizing the rotation of the plane of polarization of the linearly polarized light in accordance with the direction of magnetization due to the Kerr magneto-optical effect or the Faraday effect.

The magneto-optical recording and reproducing apparatus of the fifth embodiment is, however, greatly different from a conventional one in that parallel recording/reproduction is facilitated by using the plurality of light spots arranged on the record carrier 16. That is, in the apparatus of the fifth embodiment having the above-described structure, the modulation of the magnetic field applied to the record carrier 16 in accordance with the recording signal which is supplied to the coil driver 21 through the signal line L2 is controlled in parallel. At the same time, the laser beam projected onto the record carrier 16 is controlled in parallel, so that recording onto the record carrier 16 is carried out in parallel.

The diffraction grating is separately disposed in the above explanation, but it may be integrally provided with another optical element. Use of a blazed grating composed of a liquid crystal or similar grating as the diffraction grating also produces the same effect. The diffraction grating is used as the laser beam splitting means in the above explanation, but the laser beam splitting means is not restricted thereto and another element having a function of splitting a laser beam can also be used to the same effect.

Because of the passing light selecting means 13a pasted to the diffraction grating 25, the laser light except the second harmonic wave of semiconductor-laser-pumped solid laser light having a wavelength of not more than 600 nm, which obstructs the reduction in the diameters of the plurality of light spots formed on the record carrier 16 and, hence, hinders the enhancement of the recording density, is safely removed. It is therefore possible to secure the reduction in the diameters of the plurality of light spots formed on the record carrier 16. Since the reduction in the diameter of each light spot helps the enhancement of the recording density due to parallel recording/reproduction, it is possible, as a result, to secure the enhancement of the recording density.

Figure 8:
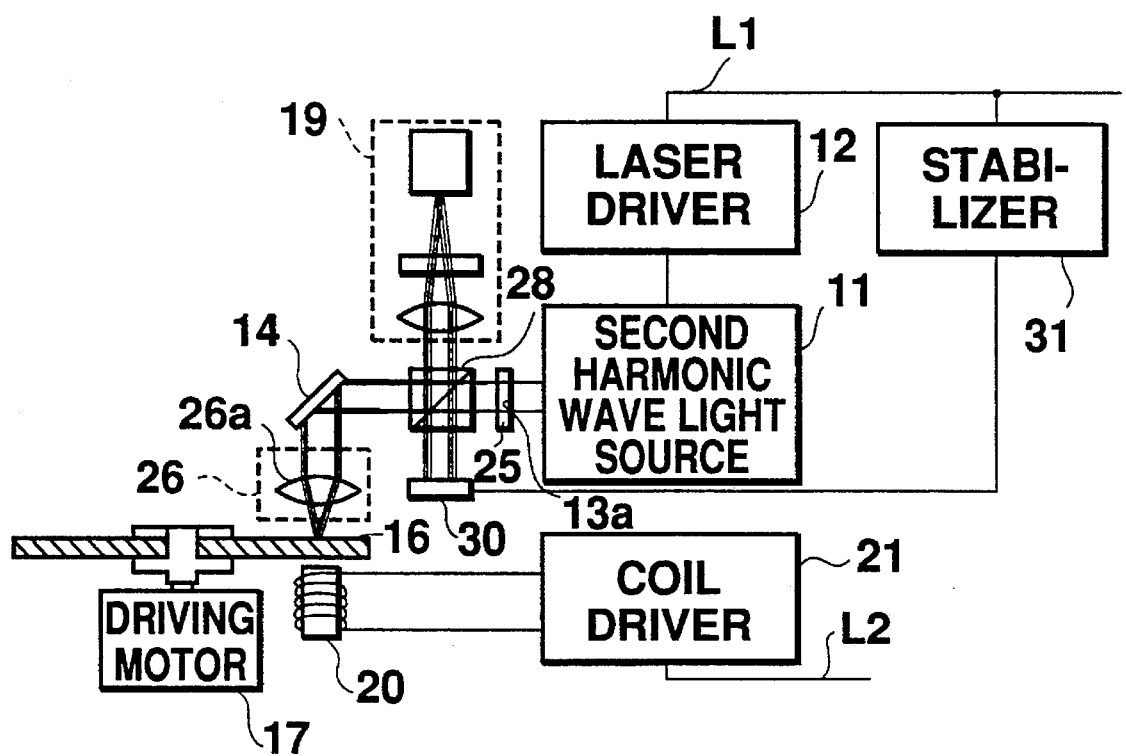
FIG. 8 schematically shows the functional structure of a sixth embodiment of a magneto-optical recording and reproducing apparatus according to the present invention.

FIG. 8 schematically shows the functional structure of a sixth embodiment of a magneto-optical recording and reproducing apparatus according to the present invention. The same numerals are provided for the elements which are the same as those in the fifth or third embodiment, and explanation thereof will be omitted.

The sixth embodiment is a combination of the fifth embodiment and the third embodiment. The magneto-optical recording and reproducing apparatus of the sixth embodiment is provided both with the diffraction grating 25, the optical head 26 and the magnetic field generating coil 20, which are characteristic of the fifth embodiment, and with the beam splitter 28, the light detector 30 and the stabilizer 31, which are characteristic of the third embodiment. In the sixth embodiment, the wavelength of the second harmonic wave of the solid laser light emitted from the second harmonic wave light source 11 is also set at not more than 600 nm.

In the magneto-optical recording and reproducing apparatus of the sixth embodiment, the second harmonic wave of solid laser light emitted from the second harmonic wave light source 11 is split into a plurality of laser beams by the diffraction grating 25, is input to the optical head 26 through the beam splitter 28 and the reflecting mirror 14, and is converged by the optical head 26 onto the record carrier 16 as a plurality of light spots. In the same way as in the fifth embodiment, the record carrier 16 is provided with the driving motor 17, and the magnetic field generating coil 20 for applying a magnetic field in accordance with the recording signal supplied through the signal line L2 at the time of irradiation by a laser beam is disposed under the record carrier 16.

The beam splitter 28 is the same as that in the third embodiment. Part of the second harmonic wave of the solid laser beam from the second harmonic wave light source 11 is reflected by the beam splitter 28. Since the light detector 30 and the stabilizer 31 are provided as in the third embodiment, parallel magnetic recording/reproduction is carried out by the plurality of light spots arranged on the record carrier 16, and the formation of the plurality of light spots is controlled effectively.

As described above, according to the magneto-optical recording and reproducing apparatus of the present invention, since a light source for generating a second harmonic wave having a wavelength of not more than 600 nm is used, it is possible to reduce the diameter of the light spot formed on the record carrier 16 and, as a result, to enhance the recording density.

By using the passing light selecting means, it is possible to secure the removal of the laser light except the second harmonic wave having a wavelength of not more than 600 nm, which obstructs the reduction in the diameter of the light spot formed on the record carrier 16 and, hence, hinders the enhancement of the recording density. It is therefore possible to secure the reduction in the diameter of the light spot formed on the record carrier 16 and, as a result, to secure the enhancement of the recording density.

In addition, by controlling the optical output or the oscillation wavelength of the pumping semiconductor laser by the output intensity detecting means and the second harmonic wave output stabilizing means, stabilization of the optical output is achieved, thereby enabling the production of a magneto-optical recording and reproducing apparatus having higher accuracy, a higher density and a larger capacity than a conventional one.

By using a combination of the passing light selecting means, the output intensity detecting means and the second harmonic wave output stabilizing means, it is possible to effectively control the formation of the light spot so that the reduction in the diameter of the light spot formed on the record carrier 16 is secured and the enhancement of the recording density is also secured.

Since parallel magnetic recording/reproduction on a plurality of tracks on one record carrier is enabled by further adopting the laser beam splitting means, the split spot forming means and the split magnetic field applying means, a reduction in recording bit length is realized and a significant increase in data transferring speed is enabled, thereby enabling the production of a magneto-optical recording and reproducing apparatus having a large capacity and a high processing speed. Since a magneto-optical recording and reproducing apparatus having a large capacity and a high processing speed is realized with a single light source because a plurality of light sources are obviated by generating a plurality of laser beams by the beam splitting means, it is possible to reduce the size and cost of the apparatus and to provide a compact and highly efficient magneto-optical recording and reproducing apparatus at a low cost.

By providing a mechanism for monitoring the optical output of the second harmonic wave component of the semiconductor-laser-pumped solid laser light which is emitted from the second harmonic wave light source, and a means for controlling the optical output or oscillation wavelength of the semiconductor-laser-pumped solid laser light in accordance with the output of the monitor, it is possible to eliminate a fluctuation in the optical output of the second harmonic wave which is caused by a fluctuation in the optical output of the fundamental wavelength of solid laser light. By using the optical head, the stabilization of the optical output is achieved, thereby producing a magneto-optical recording and reproducing apparatus having higher accuracy, a higher density and a larger capacity than a conventional one. It is also possible to remove an unnecessary light component and converge and project only the second harmonic wave component onto the record carrier, thereby enabling an efficient reduction in the light spot diameter.

Thus, it is possible to provide a magneto-optical recording and reproducing apparatus having both an overwriting function, which is a merit of a magnetic disk, and a high density and a large capacity, which are merits of an optical disk.

Figure 9A:
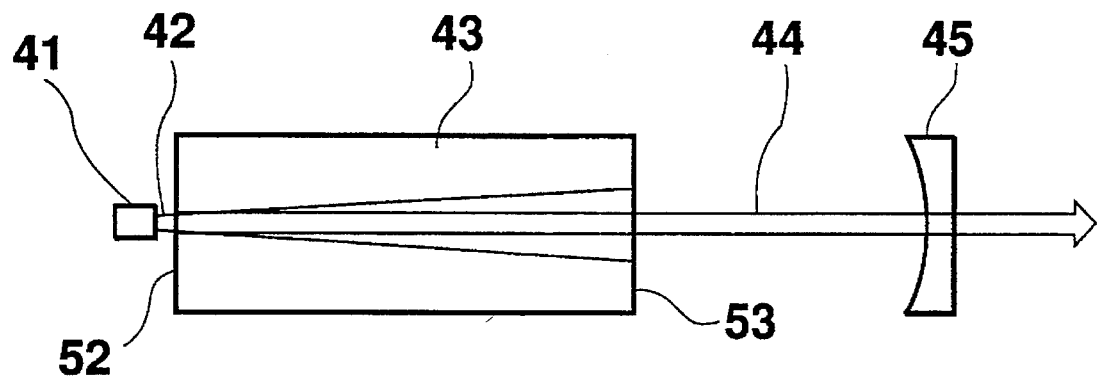
FIG. 9(A) is a plan view of a conventional semiconductor solid laser light source, and FIG. 9(B) are a side sectional view thereof.
Figure 9B:
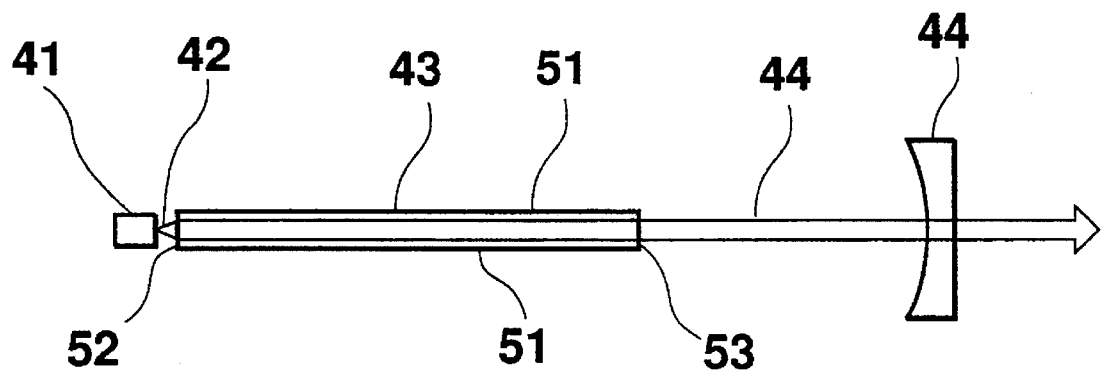

As a light source for a semiconductor-laser-pumped solid laser used as the second harmonic wave light source of a magneto-optical recording and reproducing apparatus of the present invention, a conventional light source such as that shown in FIG. 9 is usable. FIG. 9(A) is a plan view of the structure of a semiconductor-laser-pumped solid laser composed of a laser medium having a small section and an LD disposed in close proximity thereto, and FIG. 9(B) is a side sectional view thereof. This semiconductor-laser-pumped solid laser is described in *Laser Researches*, Vol 18, No. 8 (1990), pp. 622 to 627.

In FIG. 9, the reference numeral 41 represents a semiconductor laser for producing excitation light, 42 excitation light, 43 a solid laser medium such as an Nd:YAG ($Y_{3-x}Nd_xAl_5O_1$) crystal having a rectangular section of 5 mm long, 2 mm wide and 0.5 mm thick, 44 laser light emitted from the solid laser medium 43, and 52 the excitation light incident end surface of the solid laser medium 43 which is coated so that reflects no excitation light 44 while totally reflects the laser light 44. The reference numeral 45 represents a partially reflecting mirror.

The operation of the semiconductor-laser-pumped solid laser having the above-described structure will be explained hereinunder.

The excitation light 42 enters from the excitation light incident end surface 52 of the solid laser medium 43. The excitation light 42 is repeatedly reflected internally by the upper and lower surfaces 51 of the solid laser medium 43 and absorbed in the state of being confined therein. The light spreading in the perpendicular direction of the semiconductor laser activating layer is reflected by the upper and the lower surfaces 51 so that the light exciting region in the solid laser medium 43 is about 0.5 mm both in the perpendicular direction and in the parallel direction. A stable resonator is formed between the excitation light incident end surface 52 and the partially reflecting mirror 45. On the excitation light incident end surface 52, for example, if the curvature radius of the planar partially reflecting mirror 45 is 2500 mm and the length of the resonator is 10 mm, a beam having a diameter of about 0.35 mm in the fundamental mode (Gaussian mode) is oscillated.

However, it is preferable to use the following semiconductor-laser-pumped solid laser light sources as the second harmonic wave light source 11 of a magneto-optical recording and reproducing apparatus of the present invention.

Figure 10A:
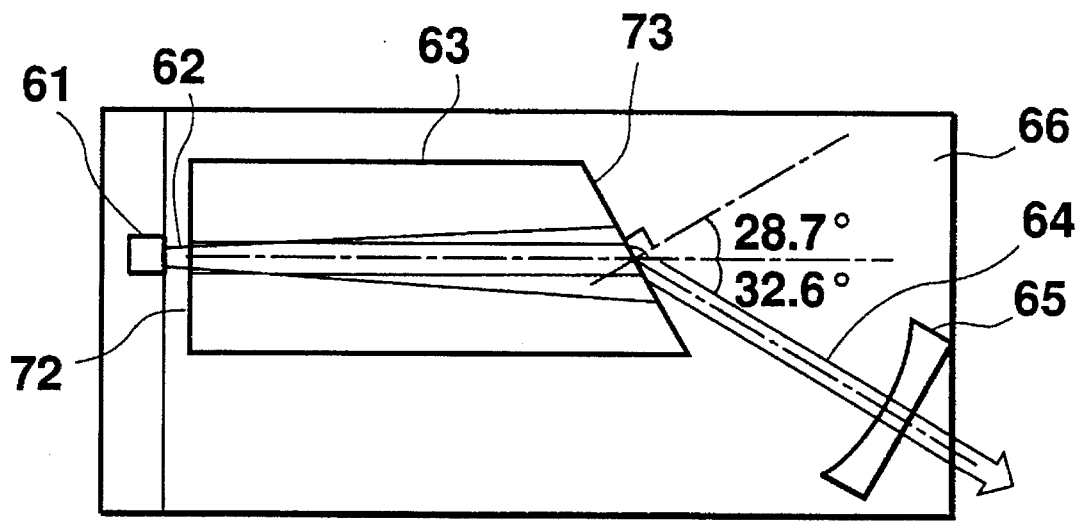
FIG. 10(A) is a plan view of the structure of a first example of a semiconductor-laser-pumped solid laser light source used in the present invention.
Figure 10B:
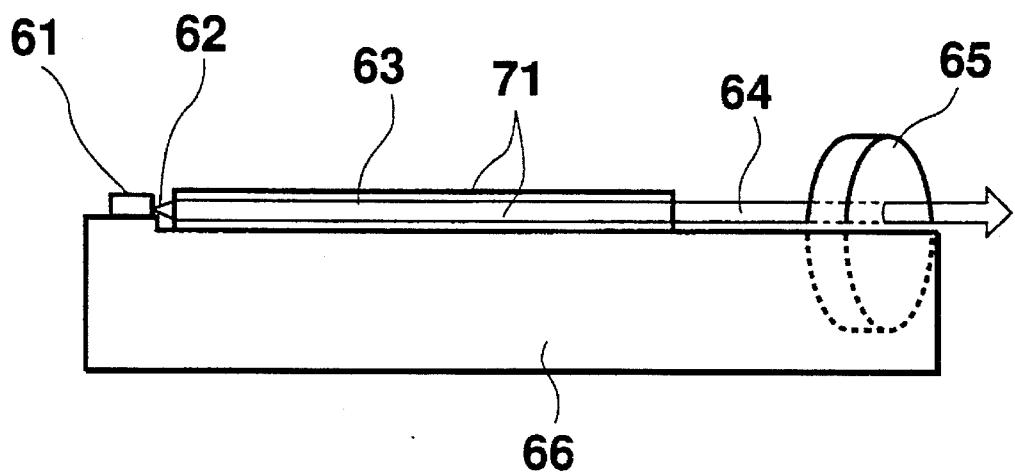
FIG. 10(B) is a side sectional view thereof.

FIG. 10(A) is a plan view of the structure of a first example of the semiconductor-laser-pumped solid laser light source, and FIG. 10(B) is a side sectional view thereof.

In these drawings, the reference numeral 61 denotes a semiconductor light for producing excitation laser, 62 excitation light, 63 a solid laser medium such as an Nd:YAG ($Y_{3-x}Nd_xAl_5O_{12}$) crystal having a rectangular section of 5 mm long, 2 mm wide and 0.5 mm thick, and 72 the excitation light incident end surface of the solid laser medium 63 which is coated so that reflects no excitation light 62 while totally reflects laser light 64. The reference numeral 64 represents the laser light emitted from the solid laser medium 63, 65 a partially reflecting mirror and 66 a box body.

The reference numeral 73 denotes the end surface of the solid laser medium 63 opposite to the excitation light incident end surface 72. The end surface 73 is not coated and cut and polished so that a Brewster angle is formed between the end surface 73 and the laser light 64 in the widthwise direction. If an Nd:YAG crystal is used for the solid laser medium 63, the refractive index thereof is about 1.83. The angle formed between the normal of the end surface 73 and the optical axis of the laser light 64 is therefore $\theta = \tan^{-1} (1/1.83) = 28.7$ (degree)

The operation of the semiconductor-laser-pumped solid laser having the above-described structure will be explained hereinunder.

The excitation light 62 enters from the excitation light incident end surface 72 of the solid laser medium 63. The excitation light 62 is repeatedly reflected internally by the upper and lower surfaces 71 of the solid laser medium 63 and absorbed in the state of being confined therein. The laser light 64 rectilinearly propagates perpendicularly to the excitation light incident end surface 72 in the solid laser medium 63 but it is refracted by the end surface 73 and then rectilinearly propagates in the air at an angle of 32.6° relative to the optical axis of the laser light 64 in the solid laser medium 63. In the light source of this example, a stable resonator is formed between the excitation light incident end surface 72 and the partially reflecting mirror 65.

All the polarized light components of the laser light 64 in the widthwise direction of the solid laser medium 63 are transmitted through the end surface 73 due to the Brewster angle of the end surface 73, and oscillated with efficiency without any loss at the end surface 73.

On the other hand, the polarized light components in the thickness wise direction have a reflectivity of not less than 20%, so that the oscillation of the polarized light components is suppressed. As a result, it is possible to obtain the oscillated laser light 64 in the form of rectilinear polarized light in the widthwise direction of the solid laser medium 63 without the need for insertion of another optical part. At this time, since the laser light 64 is constantly perpendicular to the excitation light incident end surface 72, any angle adjusting mechanism for maintaining the Brewster angle is dispensed with.

Figure 11:
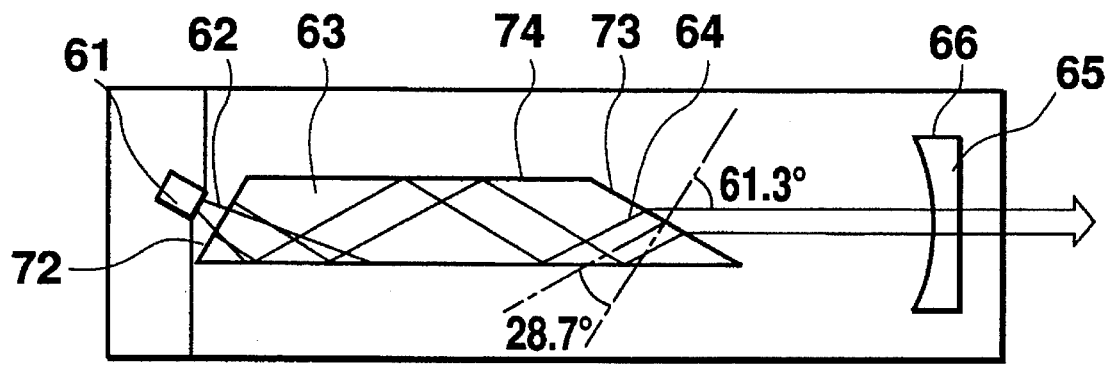
FIG. 11 is a plan view of the structure of a second example of a semiconductor-laser-pumped solid laser light source used in the present invention.

FIG. 11 is a plan view of the structure of a second example of the semiconductor-laser-pumped solid laser light source.

In FIG. 11, the laser light 64 is zigzagged by utilizing the total reflection of a side surface 74 of the solid laser medium 63. According to this structure, it is possible to set the optical axis of the laser light 64 parallel to the side surface of the solid laser medium 63 in the air, as shown in FIG. 11, by selecting the angle of total reflection. In addition, since the zigzag optical path is taken, the substantial optical path length becomes long, so that it is possible to set the length of the solid laser medium 63 at a shorter length.

Figure 12:
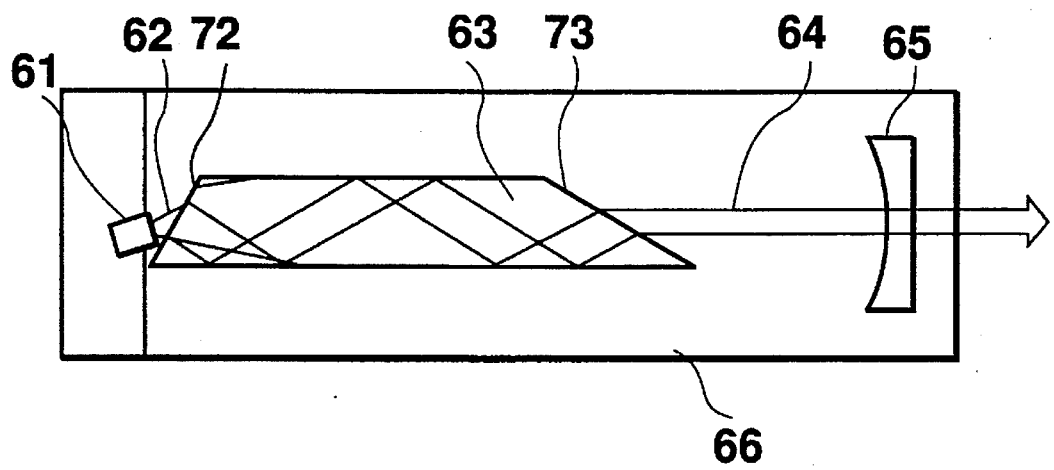
FIG. 12 is a plan view of the structure of a third example of a semiconductor-laser-pumped solid laser light source used in the present invention.

FIG. 12 is a plan view of the structure of a third example of the semiconductor-laser-pumped solid laser light source. In FIG. 12, the excitation light incident end surface 72 of the solid laser medium 63 forms a Brewster angle relative to the optical axis of the excitation light 62 and the end surface 73 opposite to the end surface 72 forms a Brewster angle relative to the optical axis of the laser light 64. According to this structure, it is possible to avoid the influence of the excitation light 62 reflected from the excitation light incident end surface 72 on the operation of the semiconductor laser 61. It is thus possible to produce a laser enabling a stabler operation.

Figure 13:
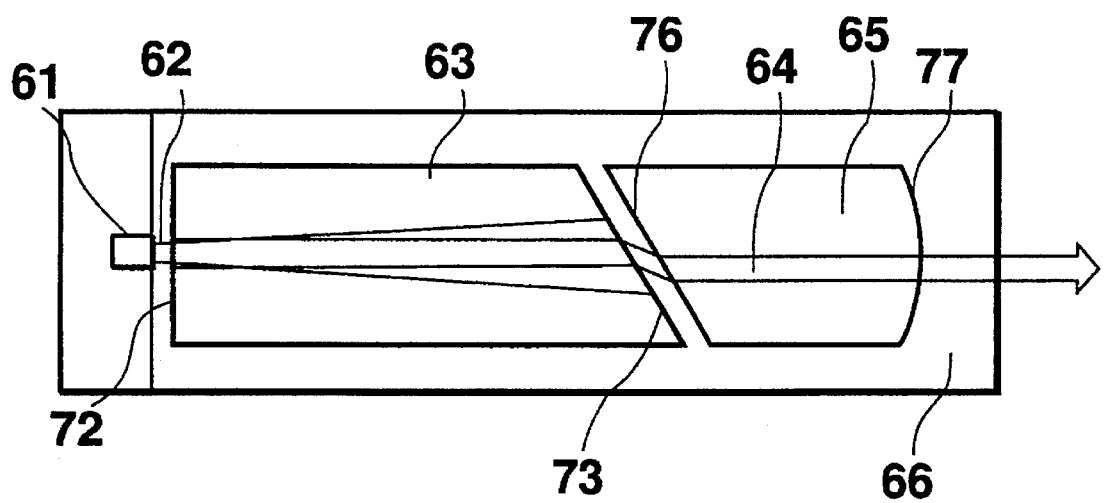
FIG. 13 is a plan view of the structure of a fourth example of a semiconductor-laser-pumped solid laser light source used in the present invention.

FIG. 13 is a plan view of the structure of a fourth example of the semiconductor-laser-pumped solid laser light source. In this example, the reflecting surface of the resonator mirror is disposed in such a manner as to face the end surface 73 of the solid laser medium 63, and the end surface 76 of the resonator mirror facing the end surface 73 of the solid laser medium 63 is obliquely cut so that the optical axis of the laser light 64 approximately propagates along a straight line as a whole. The other end surface 77 of the resonator mirror is coated so as to cause partial reflection, and constitutes a resonator in cooperation with the excitation light incident end surface 72 of the solid laser medium 63. According to this structure, the resonator mirror is parallel to the excitation light incident end surface 72 of the solid laser medium 63, thereby facilitating the assembly of an oscillator.

Figure 14:
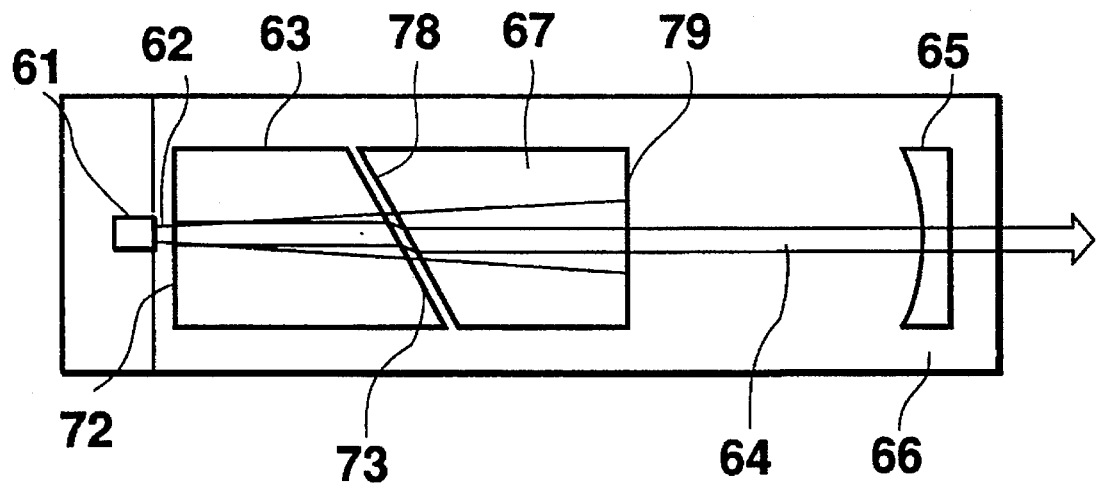
FIG. 14 is a plan view of the structure of a fifth example of a semiconductor-laser-pumped solid laser light source used in the present invention.

FIG. 14 is a plan view of the structure of a fifth example of the semiconductor-laser-pumped solid laser.

In this example, two solid laser media are provided in such a manner that the laser light 64 propagates along a straight line. One end surface 78 of a newly added solid laser medium 67 forms a Brewster angle relative to the laser light 64, and the other end surface 79 thereof is perpendicular to the laser light 64 and is coated so as to cause no reflection. According to this structure, the resonator mirror is parallel to the excitation light incident end surface 72 of the solid laser medium 63, thereby facilitating the assembly of an oscillator.

Figure 15A:
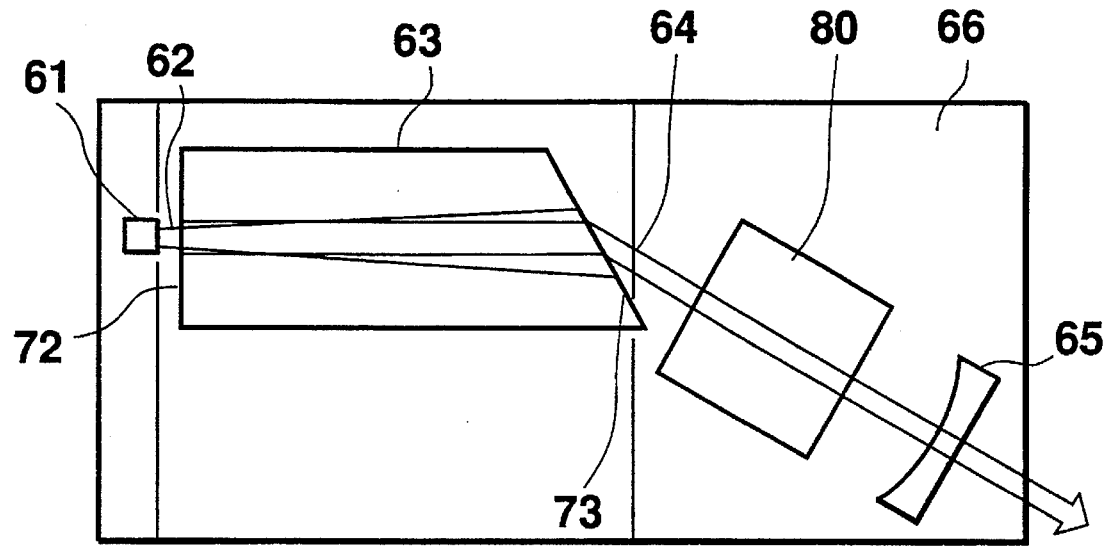
FIG. 15(A) is a plan view of the structure of a sixth example of a semiconductor-laser-pumped solid laser light source used in the present invention.
Figure 15B:
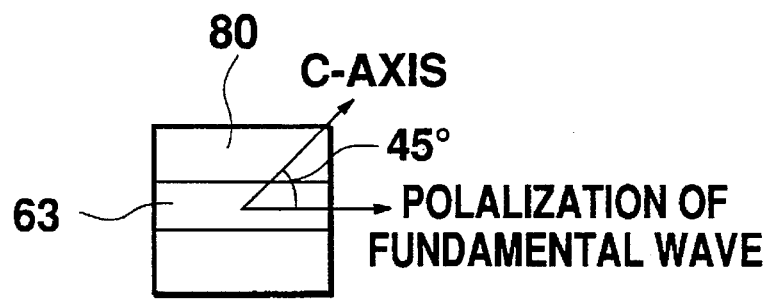
FIG. 15(B) is an explanatory view thereof in the direction of the crystallographic axis.

FIG. 15(A) is a plan view of the structure of a sixth example of the semiconductor-laser-pumped solid laser light source, and FIG. 15(B) is an explanatory view thereof in the direction of the crystallographic axis. This is an example of a semiconductor-laser-pumped solid laser for generating a second harmonic wave with efficiency by introducing a higher harmonic wave generating element 80 into a resonator. Both end surfaces of the higher harmonic wave generating element 80 is coated so as not to reflect the laser light 64. It is known that, for example, if Nd:YAG is used as the solid laser medium 63, and KTP (KTiOPO$_4$) having a phase matching of type II is used as the higher harmonic wave generating element 80, the higher harmonic wave generating efficiency reaches its maximum when the angle formed between the direction of the polarization of the laser light 64 in the resonator and the C-axis of KTP is 45°. It is therefore possible to obtain a semiconductor-laser-pumped solid laser for generating an second harmonic wave with efficiency if the C-axis of KTP is disposed at an angle or 45° relative to the side surface of the solid laser medium 63, as shown in FIG. 15(B).

Figure 16:
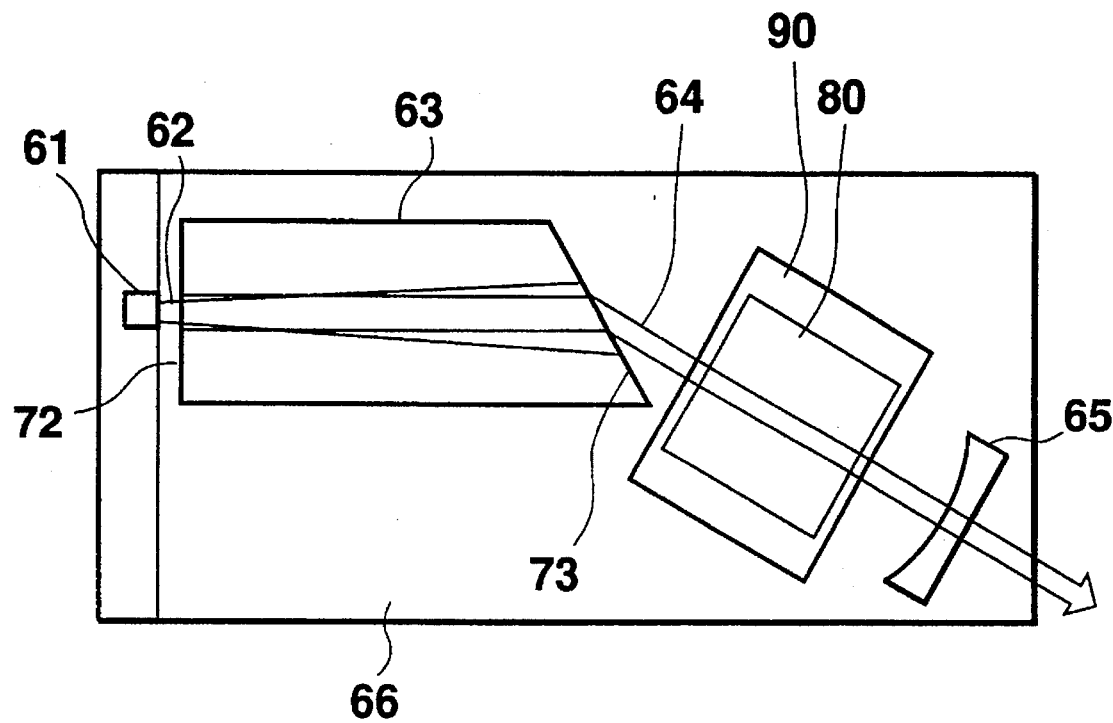
FIG. 16 is a plan view of the structure of a seventh example of a semiconductor-laser-pumped solid laser light source used in the present invention.

FIG. 16 is a plan view of the structure of a seventh example of the semiconductor-laser-pumped solid laser. In this example, a temperature adjuster 90 is added to the higher harmonic wave generating element 80 of the seventh example. The sixth example is inconvenient in that in generating a second harmonic wave of type II, the polarized light of the laser light 64 rotates in the higher harmonic wave generating element 80 and becomes elliptically polarized light, thereby increasing the loss in the resonator.

In the seventh example, the temperature of the higher harmonic wave generating element 80 is adjusted so that the difference between the optical path length for the polarized light which is horizontal to the C-axis of the crystal and the optical path length for the polarized light which is perpendicular to the C-axis of the crystal is $(n+\frac{1}{2})$ times of the wavelength of the fundamental wave of the laser light 64. According to this structure, since the fundamental wave of the laser light 64 retains the original polarized light when it goes into and comes back from the higher harmonic wave generating element 80, it is free from the loss caused by the Brewster angle and it is possible to generate a second harmonic wave with high efficiency.

Figure 17:
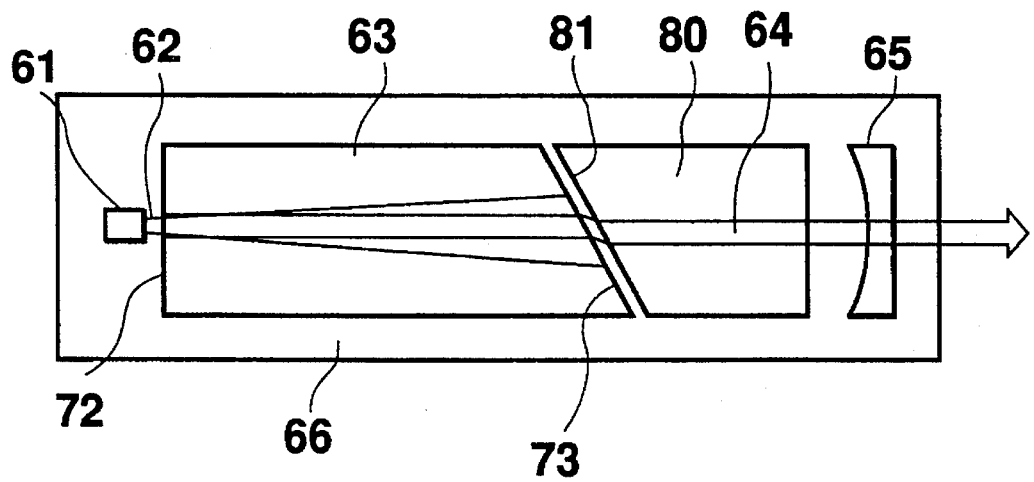
FIG. 17 is a side sectional view of an eighth example of a semiconductor-laser-pumped solid laser light source used in the present invention.

FIG. 17 is a side sectional view of an eighth example of the semiconductor-laser-pumped solid laser.

In this example, an end surface 81 of the higher harmonic wave generating element 80 of the sixth example forms a Brewster angle relative to the laser light 64. According to this structure, the resonator mirror is parallel to the excitation light incident end surface 72 of the solid laser medium 63, thereby facilitating the assembly of an oscillator. In addition, it is possible to omit the process for coating the end surface 81 so as not to reflect the laser light 64.

Figure 18:
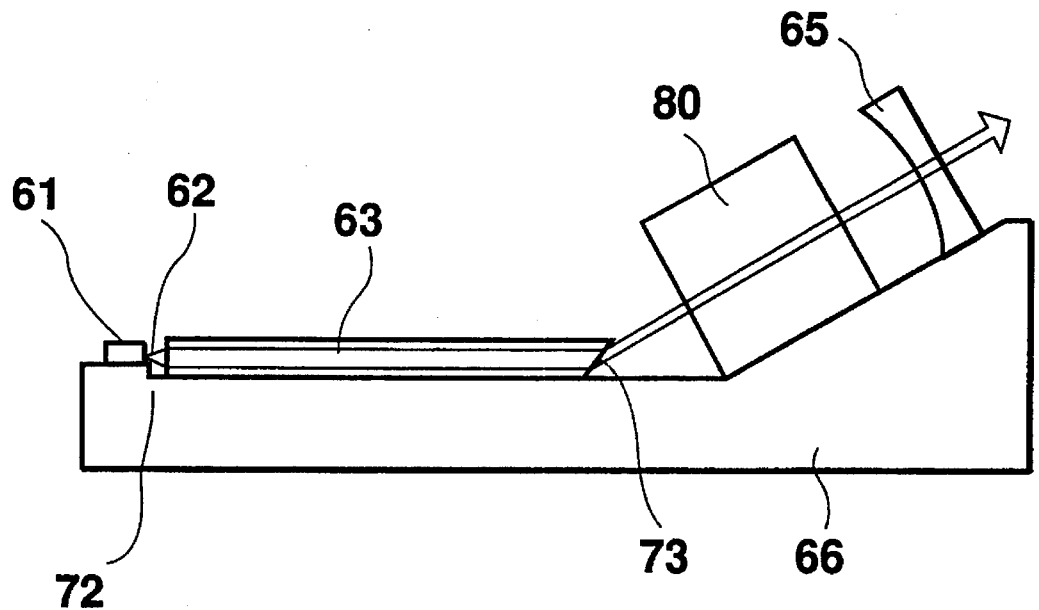
FIG. 18 is a plan view of the structure of a ninth example of a semiconductor-laser-pumped solid laser light source used in the present invention.

FIG. 18 is a plan view of the structure of a ninth example of the semiconductor-laser-pumped solid laser. In this example, the end surface 73 of the solid laser medium 63 is so formed as to have a Brewster angle in the thicknesswise direction.

Figure 19:
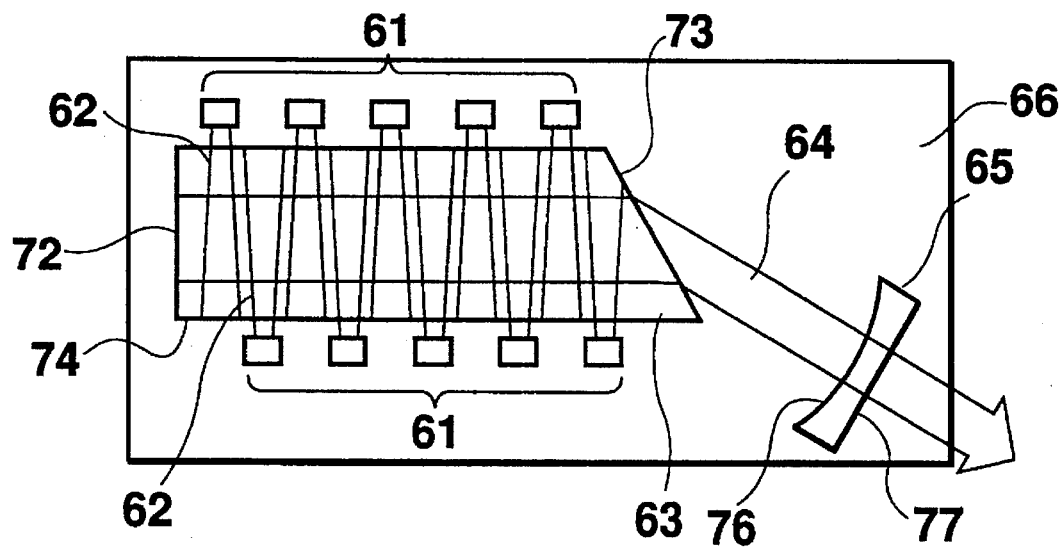
FIG. 19 is a plan view of the structure of a tenth example of a semiconductor-laser-pumped solid laser light source used in the present invention.

All of the above examples are what is called an end surface excitation type laser source in which the optical axis of the excitation light 62 agrees with the optical axis of the laser light 64 in the semiconductor laser 61. The principle of these examples may be applied with the same effect to a side surface excitation type light source in which the optical axis of the excitation light 62 is orthogonal to the optical axis of the laser light 64, as shown in FIG. 19. In the light source shown in FIG. 19, the side surface 74 of the solid laser medium 63 is coated so as not to reflect the excitation light 62.

As explained above, according to these examples, since an end surface of the solid laser medium forms a Brewster angle relative to the optical axis of the laser light, it is possible to obtain the oscillated beam of rectilinearly polarized light with efficiency without the need for adding another polarization control element. In addition, since the number of parts is small and an angle adjusting mechanism for maintaining a Brewster angle is dispensed with, the assembly of the light source device is facilitated.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A magneto-optical recording and reproducing apparatus for recording information at a position of a record carrier irradiated with a laser beam by applying a magnetic filed whose polarity is inverted or whose strength is modulated in accordance with said recording information to said record carrier and by irradiating said recording information to said record carrier with said laser beam, said magneto-optical recording and reproducing apparatus comprising:
(a) a second harmonic wave light source for emitting a second harmonic wave of semiconductor-laser-pumped solid laser light;
(b) laser beam splitting means for splitting said second harmonic wave emitted from said second harmonic wave light source into a plurality of laser beams;
(c) split spot forming means for impinging said plurality of laser beams emitted from said laser splitting means to form a plurality of corresponding light spots at a plurality of predetermined positions on said regard carrier; and
(d) split magnetic field applying means for applying magnetic fields whose polarities are inverted or show strengths are modulated in accordance with said recording information to the plurality of corresponding light spots formed on said record carrier by said split spot forming means, such that focusing information, tracking information and said recording information are obtained from the plurality of corresponding light spots.

2. The magneto-optical recording and reproducing apparatus of claim 1, wherein a wavelength of the laser light emitted from said second harmonic wave light source is not more than 600 nm.

3. The magneto-optical recording and reproducing apparatus of claim 1, further comprising passing light selecting means for passing only a second harmonic wave component of said semiconductor-laser-pumped solid laser light.

4. The magneto-optical recording and reproducing apparatus of claim 3, wherein said passing light selecting means is one of a band pass filter, an interference filter, and a colored glass filter.

5. A magneto-optical recording and reproducing apparatus, comprising:
a second harmonic wave light source for emitting a second harmonic wave of laser light;
spot forming means for impinging said second harmonic wave of a predetermined position of said record carrier to form a light spot; and
magnetic field applying means for applying the magnetic field whose polarity is inverted or whose strength is modulated in accordance with said recording information to said record carrier;
wherein said second harmonic wave of said laser light is the second harmonic wave of semiconductor-laser-pumped solid laser light; and
wherein said second harmonic wave light source for said semiconductor-laser-pumped solid laser light includes a semiconductor laser for producing excitation light, a solid laser medium having a section sufficiently small with respect to a spread of said excitation light, and a laser resonator for emitting the laser light from said solid laser medium, wherein an angle formed between an optical axis of the laser light and an optical axis of oscillated laser light is a Brewster angle.

6. The magneto-optical recording and reproducing apparatus of claim 5, wherein the optical axis of said laser light is coaxial with an optical axis of said excitation light in said second harmonic wave light source for said semiconductor-laser-pumped solid laser light.

7. The magneto-optical recording and reproducing apparatus of claim 6, wherein the end surface of said solid laser medium is perpendicular to said laser light and is coated to cause total reflection, and said laser light is propagated rectilinearly in said laser medium.

8. The magneto-optical recording and reproducing apparatus of claim 6, wherein the end surface of said solid laser medium is perpendicular to the laser light and is coated to cause total reflection, and said laser light is zigzagged in said solid laser medium by utilizing the total reflection of a side surface of the solid laser medium.

9. The magneto-optical recording and reproducing apparatus of claim 8, wherein an angle formed between the end surface of said solid laser medium and said optical axis of said excitation light at the wavelength of said excitation light is a Brewster angle.

10. The magneto-optical recording and reproducing apparatus of claim 5, wherein the optical axis of said laser light is approximately perpendicular to an optical axis of said excitation light in said second harmonic wave light source for said semiconductor-laser-pumped solid laser light.

11. The magneto-optical recording and reproducing apparatus of claim 5, wherein a higher harmonic wave generating element is provided in said laser resonator of said second harmonic wave light source for said semiconductor-laser-pumped solid laser light.

12. The magneto-optical recording and reproducing apparatus of claim 11, wherein an angle formed between an end surface of said higher harmonic wave generating element and the optical axis of said laser light is a Brewster angle.

13. The magneto-optical recording and reproducing apparatus of claim 11, wherein a length and a temperature of said higher harmonic wave generating element are adjusted so that said higher harmonic wave generating element constitutes a half-wave plate with respect to said laser light.

14. The magneto-optical recording and reproducing apparatus of claim 1, wherein said split spot forming means forms the plurality of corresponding light spots at the plurality of predetermined positions on said record carrier at the same time.

15. The magneto-optical recording and reproducing apparatus of claim 14, wherein the plurality of predetermined positions are on a plurality of tracks.

16. The magneto-optical recording and reproducing apparatus of claim 15, wherein a first of the plurality of corresponding light spots is used for reproduction.

17. The magneto-optical recording and reproducing apparatus of claim 15, wherein one of the plurality of corresponding light spots is used for reproduction.

18. The magneto-optical recording and reproducing apparatus of claim 14, wherein the plurality of corresponding light spots are utilized for one of parallel recording on a plurality of tracks and parallel reproducing on the plurality of tracks.

19. The magneto-optical recording and reproducing apparatus of claim 15, wherein the plurality of corresponding light spots are utilized for one of parallel recording on the plurality of tracks and parallel reproducing on the plurality of tracks.

* * * * *